(12) United States Patent
Xiang et al.

(10) Patent No.: US 10,196,265 B2
(45) Date of Patent: Feb. 5, 2019

(54) REFORMER OF SYSTEM PREPARING HYDROGEN WITH AN AQUEOUS SOLUTION OF METHANOL, SYSTEM PREPARING HYDROGEN WITH AN AQUEOUS SOLUTION OF METHANOL, METHOD OF PREPARING HYDROGEN

(71) Applicant: GUANGDONG HYDROGEN ENERGY SCIENCE AND TECHNOLOGY CO., LTD, Dongguan (CN)

(72) Inventors: Hua Xiang, Dongguan (CN); Shengli Xiang, Dongguan (CN)

(73) Assignee: GUANGDONG HYDROGEN ENERGY SCIENCE & TECHNOLOGY CO., Dongguan (CN)

( * ) Notice: Subject to any disclaimer, the term of this patent is extended or adjusted under 35 U.S.C. 154(b) by 1 day.

(21) Appl. No.: 15/229,081

(22) Filed: Aug. 4, 2016

(65) Prior Publication Data
US 2016/0340183 A1     Nov. 24, 2016

Related U.S. Application Data

(63) Continuation of application No. PCT/CN2015/077344, filed on Apr. 24, 2015.

(30) Foreign Application Priority Data

Nov. 7, 2014    (CN) .......................... 2014 1 0621689

(51) Int. Cl.
*B01J 7/02*        (2006.01)
*C01B 3/32*       (2006.01)
(Continued)

(52) U.S. Cl.
CPC .................. *C01B 3/22* (2013.01); *B01J 7/02* (2013.01); *C01B 3/32* (2013.01); *C01B 3/323* (2013.01);
(Continued)

(58) Field of Classification Search
CPC .................. Y02P 20/128; Y02P 30/30; C01B 2203/0822; C01B 2203/0811;
(Continued)

(56) References Cited

U.S. PATENT DOCUMENTS

| | | | |
|---|---|---|---|
| 2004/0153804 A1* | 8/2004 | Blevins | G05B 15/02 |
| | | | 714/33 |
| 2010/0300382 A1* | 12/2010 | Yahagi | C01B 3/323 |
| | | | 123/3 |
| 2016/0272491 A1* | 9/2016 | Xiang | C01L 33/505 |

* cited by examiner

*Primary Examiner* — Amber R Orlando
*Assistant Examiner* — Syed T Iqbal
(74) *Attorney, Agent, or Firm* — Hemisphere Law, PLLC; Zhigang Ma

(57) ABSTRACT

The disclosure discloses a reformer of a system for preparing hydrogen with an aqueous solution of methanol, a system for preparing hydrogen with an aqueous solution of methanol and a hydrogen production method. An end of a reformer of a system for preparing hydrogen with an aqueous solution of methanol has an initiation device, the initiation device includes a holder, the holder has a material input tube, a heating vaporization tube, an ignition device and a temperature detection device; the material input tube and the heating vaporization tube are communicated, the material enters the heating vaporization tube through the material input tube and is exported from an end of the heating vaporization tube; a position of the ignition device is corresponding to the end of the heating vaporization tube, the ignition device is applied to ignite the material exported from the heating vaporization tube.

6 Claims, 7 Drawing Sheets

(51) Int. Cl.
    *C01B 3/22*           (2006.01)
    *C01B 3/38*           (2006.01)
    *C01B 3/50*           (2006.01)

(52) U.S. Cl.
    CPC .............. *C01B 3/382* (2013.01); *C01B 3/384* (2013.01); *C01B 3/505* (2013.01); *C01B 2203/0233* (2013.01); *C01B 2203/0272* (2013.01); *C01B 2203/0283* (2013.01); *C01B 2203/041* (2013.01); *C01B 2203/0405* (2013.01); *C01B 2203/0811* (2013.01); *C01B 2203/1223* (2013.01); *C01B 2203/1288* (2013.01); *C01B 2203/148* (2013.01); *C01B 2203/1604* (2013.01); *C01B 2203/169* (2013.01); *C01B 2203/1614* (2013.01); *C01B 2203/1619* (2013.01); *C01B 2203/1623* (2013.01)

(58) Field of Classification Search
    CPC .... C01B 2203/1223; C01B 2203/0405; C01B 3/56; C01B 2203/0233; C01B 2203/0475; C01B 3/323; C01B 2203/1604; C01B 2203/1288; C01B 3/505; B01J 2219/00083; B01J 2219/00135; B01J 2208/00716; B01J 19/242; B01J 2208/00415; B01J 2208/00141; B01J 19/243; B01J 8/0403; B01J 7/02; B01J 2219/1944
See application file for complete search history.

REFORMER OF SYSTEM PREPARING HYDROGEN WITH AN AQUEOUS SOLUTION OF METHANOL, SYSTEM PREPARING HYDROGEN WITH AN AQUEOUS SOLUTION OF METHANOL, METHOD OF PREPARING HYDROGEN

FIELD OF THE DISCLOSURE

The disclosure relates to a device preparing hydrogen with an aqueous solution of methanol technical field, and more particularly to a reformer of a system for preparing hydrogen with an aqueous solution of methanol, meanwhile, the disclosure further relates to a system for preparing hydrogen with an aqueous solution of methanol and a method of preparing hydrogen.

BACKGROUND OF THE DISCLOSURE

Hydrogen is one of the most ideal energy sources in $21^{st}$ century, hydrogen generates the most amount of energy under the circumstance of burning the same weight of coal, gasoline and hydrogen, and the product of combustion is water without ashes or emissions, which will not harm the environment; products of combustion after burning coal and petroleum are primarily $CO_2$ and $SO_2$, which cause the greenhouse effect and the acid rain respectively. Reserves of coal and petroleum are restricted, hydrogen is primarily reserved in water, and water is the only product of combustion, which can generate hydrogen continuously without limitation. Hydrogen is spread widely, water is the warehouse of hydrogen, with 11% hydrogen included. The soil contains 1.5% hydrogen; hydrogen can be found in petroleum, coal, natural gas, animals and plants. Hydrogen primarily exists in a form of water, and water covers 70% surface of the earth, which is considerable, therefore, hydrogen is a limitless resource. Hydrogen will be an inexpensive energy source if it can be produced by a proper method.

At present, an annual yield of hydrogen worldwide is around 36 thousand tons, hydrogen is primarily prepared by two methods: one is prepared by petroleum, coal and natural gas, which will consume limited mineral materials, and most hydrogen is generated by the manner; the other is prepared by the method of electrolysis of water, which consumes a great deal of electric energy and is not economic, around 4% hydrogen is produced by the method. The technology that prepares hydrogen with an aqueous solution of methanol is improved with the development of technique, which can reduce energy consumption and costs in chemical production, hopefully substituting the process of electrolysis of water generating hydrogen that requires a large amount of electric energy. Hybrid gases of $H_2$ and $CO_2$ are obtained by advanced reforming technology of producing hydrogen with an aqueous solution of methanol, $H_2$ and $CO_2$ can be separated by a palladium membrane separator.

Referring to Chinese patent application No. 201310340475.0 (applicant: SHANGHAI HEJI DEDONG HYDROGEN MACHINE CO LTD), an aqueous solution of methanol vapor undergo methanol decomposition and a reaction of carbon monoxide in a temperature of 350-409° C. and a pressure of 1-5 MPa with assistance of a catalyst, producing hydrogen and carbon oxide, which is a multi-componential, multi-reactional catalytic system with gases and solids. Reaction equations are as follows:

$$CH_3OH \rightarrow CO + 2H_2 \quad (1)$$

$$H_2O + CO \rightarrow CO_2 + H_2 \quad (2)$$

$$CH_3OH + H_2O \rightarrow CO_2 + 3H_2 \quad (3)$$

$H_2$ and $CO_2$ generated by the reforming reaction are separated by the palladium membrane separator of a separation chamber, highly purified hydrogen can be achieved.

The catalytic reaction of an aqueous solution of methanol occurs in the reformer of the device producing hydrogen with an aqueous solution of methanol, the reformer includes a reforming housing and a combustion chamber and a reforming chamber in the reforming housing, as well as an initiation device, generally, a temperature in the reforming chamber is 350-409° C., a temperature in the combustion chamber is 405-570° C., which make the reformer to run properly. Initiation of the reformer is triggered by the initiation device, in a conventional technique, it takes long to cold start, generally more than 5 hours, and warm start consumes a great deal of energy, keeping devices such as the reforming chamber in a high temperature.

Accordingly, the inventor applied a patent No. 201310578086.1 on Nov. 18, 2013 (applicant: SHANGHAI HEJI DEDONG HYDROGEN MACHINE CO LTD), the patent disclosed a system for preparing hydrogen with an aqueous solution of methanol that can be started rapidly and a method of preparing hydrogen thereof, the system for preparing hydrogen with an aqueous solution of methanol includes an initiation device, the initiation device includes a first initiation device and a second initiation device, the first initiation device includes a housing, a first heater, a first vaporization tube, the first vaporization tube twists the first heater tightly; the first heater can be an electric heating rod, powered by an alternating current, a rechargeable battery or a battery, the first heater heats the first vaporization tube to output vaporized methanol from the first vaporization tube; the second initiation device includes a second vaporization tube, vaporized methanol exported from the first vaporization tube is burned to heat the second vaporization tube, in order to vaporize methanol in the second vaporization tube, so that the second vaporization tube heats the reforming chamber for initiating the system of producing hydrogen.

However, the system for preparing hydrogen with an aqueous solution of methanol still has following shortcomings: vaporization of methanol in the first vaporization tube of the first initiation device needs to be heated by the first heater, and the heater is an electric heating rod, powered by an alternating current, a rechargeable battery or a battery, it takes shorter time to initiate the reformer by electric heating in a conventional technique, but not short enough, for vaporization or burning of an aqueous solution of methanol, the first vaporization tube generally needs to be heated up to more than 200° C. Moreover, it might be unsafe to be powered by the alternating current, a power bank such as a rechargeable battery or a battery is consumed rapidly, charging and replacing of which bring extra trouble. Moreover, the first vaporization tube twists the heater, which prevents all the heat generated by the heater being applied on the first vaporization tube, the first initiation device and the device preparing hydrogen (reformer) need to be disposed separately, which reduce heating efficiency of the first initiation device heating the second initiation device in the device preparing hydrogen (reformer).

SUMMARY OF THE DISCLOSURE

The technical problems to be solved by the disclosure are aiming at the disadvantages of the conventional technique above to provide a reformer of a system for preparing hydrogen with an aqueous solution of methanol, which can be initiated rapidly with high heating efficiency and safe without an electric heater. Meanwhile, the disclosure further provides a system for preparing hydrogen with an aqueous solution of methanol equipped with the reformer and a hydrogen production method of the system for preparing hydrogen with an aqueous solution of methanol.

To solve the first technical problem above, the disclosure provides an end of a reformer of a system for preparing hydrogen with an aqueous solution of methanol has an initiation device, the initiation device includes a holder, the holder has a material input tube, a heating vaporization tube, an ignition device and a temperature detection device; the material input tube and the heating vaporization tube are communicated, the material enters the heating vaporization tube through the material input tube and is exported from an end of the heating vaporization tube; a position of the ignition device is corresponding to the end of the heating vaporization tube, the ignition device is applied to ignite the material exported from the heating vaporization tube, the material burns after being ignited by the ignition device to heat the heating vaporization tube, the material in the heating vaporization tube is vaporized and combustion intensity increases rapidly in order to heat the reformer; the temperature detection device is applied to detect an ambient temperature of the heating vaporization tube.

The holder includes a mounting section and a liquid container on the mounting section, the material input tube, the heating vaporization tube, the ignition device and the temperature detection device are disposed on the mounting section of the holder, the liquid container can contain the material exported from the end of the heating vaporization tube, a splash cover is disposed on top of the liquid container.

The heating vaporization tube includes a straight section, a spiral section and an arched section in sequence, the material can be transported to the highest position of the straight section, and then twist down through the spiral section, finally exported from the arched section.

A bottom of the holder has an inlet cover, the inlet cover is connected with an air passage, and external air can enter the reformer through the air passage.

An electromagnetic valve is disposed in the material input tube, in order to control the material input tube to be open or closed.

To solve the second technical problem above, the disclosure provides a system for preparing hydrogen with an aqueous solution of methanol, including a container, a material transportation device, a reformer and a membrane separation device, the material transportation device is applied to transport an aqueous solution of methanol in the container to the reformer and an initiation device on an end of the reformer respectively; the initiation device is mounted on the end of the reformer, the initiation device includes a holder, a material input tube, a heating vaporization tube, an ignition device and a temperature detection device are mounted on the holder; the material input tube and the heating vaporization tube are communicated, the material enters the heating vaporization tube through the material input tube and is exported from an end of the heating vaporization tube; a position of the ignition device is corresponding to the end of the heating vaporization tube, the ignition device is applied to ignite the material exported from the heating vaporization tube, the material is burning after being ignited by the ignition device to heat the heating vaporization tube, the material in the heating vaporization tube is vaporized and combustion intensity increases rapidly in order to heat the reformer; the temperature detection device is applied to detect an ambient temperature of the heating vaporization tube; the membrane separation device is a membrane separation device of plating palladium silver alloy on a surface of porous ceramics in vacuum, a plating layer is the palladium silver alloy, palladium in the palladium silver alloy is 75%~78% in mass, silver is 22%~25%.

The holder includes a mounting section and a liquid container on the mounting section, the material input tube, the heating vaporization tube, the ignition device and the temperature detection device are disposed on the mounting section of the holder, the liquid container can contain the material exported from the end of the heating vaporization tube, a splash cover is disposed on top of the liquid container.

The heating vaporization tube includes a straight section, a spiral section and an arched section in sequence, the material is transported to the highest position of the straight section, and then twists down through the spiral section, finally is exported from the arched section.

To solve the third technical problem above, the disclosure provides a hydrogen production method of the system for preparing hydrogen with an aqueous solution of methanol, including following steps.

a. A control device controls the material transportation device to transport the aqueous solution of methanol in the container to the initiation device on the end of the reformer at a first speed.

b. The aqueous solution of methanol drop out of the end of the heating vaporization tube after passing through the material input tube and the heating vaporization tube of the initiation device in turn.

c. The control device controls the ignition device to ignite, the aqueous solution of methanol dropping out of the end of the heating vaporization tube is ignited.

d. The temperature detection device detects the ambient temperature of the heating vaporization tube, and feeds the temperature back to the control device, the control device detects an ignition to be done or not; if the temperature achieves a reference of ignition set up by the control device, the aqueous solution of methanol is ignited, the ignition succeeds, if the temperature fails to achieve the reference of ignition set up by the control device, the ignition fails and the control device controls the ignition device to re-ignite.

e. After the ignition succeeds, the control device controls the material transportation device to transport the aqueous solution of methanol in the container to the initiation device on the end of the reformer at a second speed, the second speed is 1.5~3 times of the first speed.

f. Combustion intensity an aqueous solution of methanol is increasing, the temperature is increasing, the aqueous solution of methanol in the heating vaporization tube is vaporized.

g. Vaporized aqueous solution of methanol is burning in the reformer rapidly to heat the reformer; the control device controls the material transportation device to transport the aqueous solution of methanol in the container to the reformer, a temperature in the reformer achieves a temperature for a reforming reaction of preparing hydrogen by an aqueous solution of methanol, the reformer is initiated.

h. After the reformer is initiated, the control device controls an input valve of the ignition device to be closed.

i. Partial hydrogen produced in the reformer is applied in operation of the reformer, the rest is exported after being separated by the membrane separation device.

A heat exchanger is disposed out of the reformer, the aqueous solution of methanol in the container is transported to the heat exchanger for exchanging heat, subsequently entering the reformer.

Beneficial effects of the disclosure are: first, as the initiation device of the reformer is ignited by the ignition device, vaporizing the material in the heating vaporization tube and increasing combustion intensity rapidly, in order to heat the reformer, heating efficiency and speed are high, proved by a test, a restart can be done in 5 minutes; second, as the initiation device of the reformer is heated by ignition both in the initiation period and the heating period, the electric heater is unnecessary, heat efficiency is high due to abandonment of the electric heater in a first period of a conventional technique, moreover, security issues such as the electric heating wire is fused during heating can be prevented, a rechargeable battery or a battery can be omitted; third, the initiation device is built-in an end of the reformer, so that heat generated by the initiation device can totally be applied to heat the reformer, which saves energy and improves heat efficiency to the maximum extent.

DETAILED DESCRIPTION OF PREFERRED EMBODIMENTS

Structures and operational principle of the disclosure are described in detail with reference to the accompanying drawings as follows.

Figure 1:
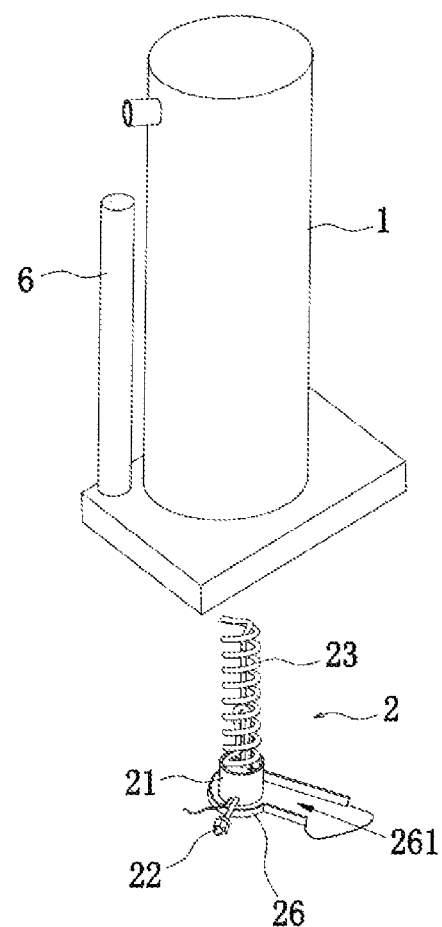
FIG. 1 is a schematic, structural view of a separated reformer according to an embodiment of the disclosure.
Figure 2:
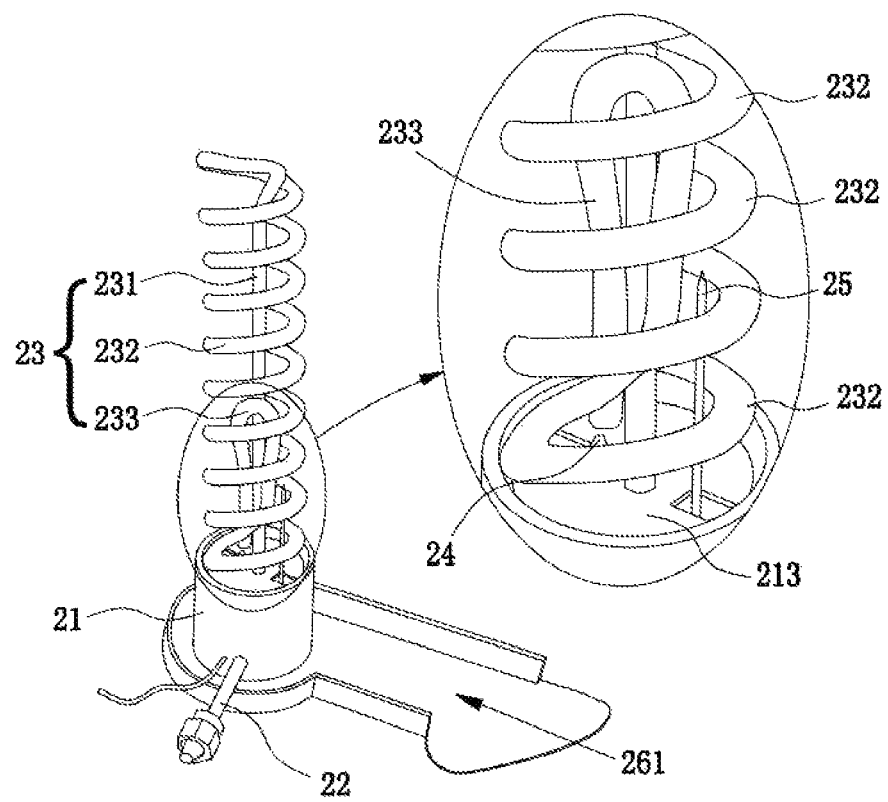
FIG. 2 is a schematic, structural view of an integrated reformer according to an embodiment of the disclosure.
Figure 3:
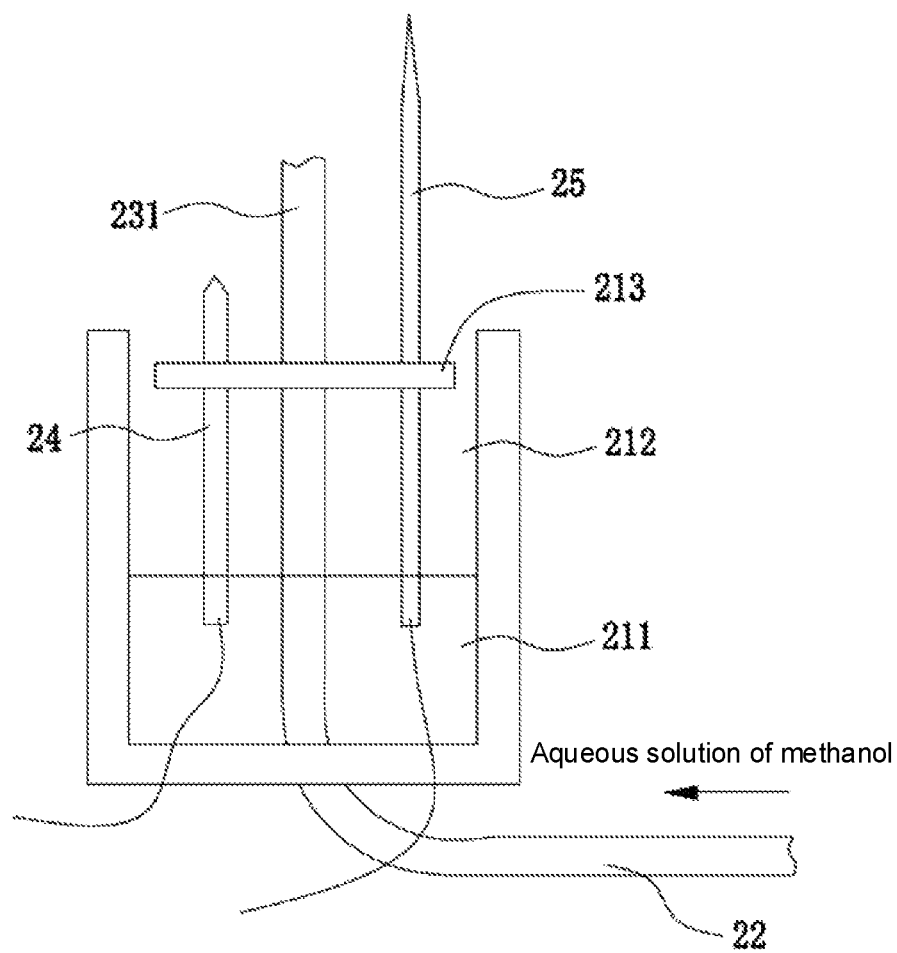
FIG. 3 is a schematic, structural view of a holder of an initiation device of a reformer according to an embodiment of the disclosure.

Embodiment one: a reformer 1 of a system producing hydrogen with an aqueous solution of methanol is shown in FIG. 1~FIG. 3, an initiation device 2 is mounted on an end of the reformer 1, the initiation device 2 includes a holder 21, a material input tube 22, a heating vaporization tube 23, an ignition device 24 and a temperature detection device 25 are mounted on the holder 21; the material input tube 22 and the heating vaporization tube 23 are connected, the material enters the heating vaporization tube 23 through the material input tube 22 and is exported from an end of the heating vaporization tube 23; a position of the ignition device 24 is corresponding to the end of the heating vaporization tube 23, the ignition device 24 is applied to ignite the material exported from the heating vaporization tube 23, the material burns after being ignited by the ignition device 24 to heat the heating vaporization tube 23, the material in the heating vaporization tube 23 is vaporized and combustion intensity increases rapidly in order to heat the reformer 1; the temperature detection device 25 is applied to detect an ambient temperature of the heating vaporization tube 23. The material is not restricted to an aqueous solution of methanol; other energy materials can be available, in the embodiment, the material is the aqueous solution of methanol, identically to those of the reformer.

It needs to be illustrated that the reformer further includes a reforming heating tube, a reforming vaporization tube, a reforming chamber, a combustion chamber, in the reformer, the aqueous solution of methanol enters the reforming chamber through the heating tube and reforms in the reforming chamber to generate hydrogen and carbon oxide, partial of which is burning in the combustion chamber to provide heat for the reformer, the rest will be exported by the reforming vaporization tube; during the process, a temperature in the reforming chamber needs to be 350-409° C., and a temperature in the combustion chamber needs to be 405-570° C. In a first embodiment of the disclosure, the initiation device 2 is utilized for heating the reformer 1 to initiate the reformer, then a reforming reaction occurs, a time for initiation is within 5 minutes.

As shown in FIG. 1~FIG. 3, the holder 21 includes a mounting section 211 and a liquid container 212 on the mounting section 211, the material input tube 22, the heating vaporization tube 23, the ignition device 24 and the temperature detection device 25 are mounted on the mounting section 211 of the holder, the liquid container 212 can contain the material exported from the end of the heating vaporization tube 23, a splash cover 213 is disposed on top of the liquid container 212. When material is exported by the heating vaporization tube 23 after being imported by the material input tube 22, extra material can be contained in the liquid container 212 of the holder, obviously, after the material is burning rapidly, the material in the liquid container 212 can vaporize and burn as well. The splash cover 213 can prevent material in the liquid container 212 from splashing during inflammation.

As shown in FIG. 2, an internal diameter of the heating vaporization tube 23 is 1-2 cm, the heating vaporization tube 23 includes a straight section 231, a spiral section 232 and an arched section 233 in sequence, the material can be transported to the highest position of the straight section 231, and then twist down through the spiral section 232, finally exported from the arched section 233. When the initiation device starts to work, the material enters the heating vaporization tube 23, the material can be dropped out of the end of the arched section 233 in a form of drops under the influence of the arched section 233, so that the ignition device can ignite; after ignition succeeds, as length and heating surface of the spiral section 232 are considerable, the material in the spiral section 232 can be vaporized thoroughly.

As shown in FIG. 1 and FIG. 2, a bottom of the holder 21 has an inlet cover 26, the inlet cover 26 is connected with an air passage 261, and external air can enter the reformer 1 through the air passage 261. The external air entered through the air passage 261 can provide oxygen to the initiation device 2, as well as the reformer 1. A fan can be added on outside of the air passage 261 (not shown in the figures) for increasing the amount of the entered air.

An electromagnetic valve (not shown in the figures) is disposed in the material input tube 22, in order to control the material input tube 22 to be open or closed. The ignition device can be an igniter resisting high temperature on sale, such as an electronic pulse ignition device.

Embodiment two: as shown in FIG. 4~FIG. 7, a system for preparing hydrogen with an aqueous solution of methanol includes a container 3, a material transportation device 4, a reformer 41 and a membrane separation device 5, the material transportation device 4 is applied to transport an aqueous solution of methanol in the container 3 to the reformer 41 and an initiation device 42 on an end of the reformer respectively; the initiation device 42 is mounted on the end of the reformer 41, the initiation device 42 is identical to the initiation device 2 in the first embodiment, the initiation device 42 includes a holder 421, a material input tube 422, a heating vaporization tube 423, an ignition device 424 and a temperature detection device 425 are mounted on the holder 421; the material input tube 422 and the heating vaporization tube 423 are connected, the material enters the heating vaporization tube 423 through the material input tube 422 and is exported from an end of the heating vaporization tube 423; a position of the ignition device 424 is corresponding to the end of the heating vaporization tube 423, the ignition device 424 is applied to ignite the material exported from the heating vaporization tube 423, the material burns after being ignited by the ignition device 424 to heat the heating vaporization tube 423, the material in the heating vaporization tube 423 is vaporized and combustion intensity increases rapidly in order to heat the reformer 41; the temperature detection device 425 is applied to detect an ambient temperature of the heating vaporization tube 423; the membrane separation device 5 is a membrane separation device of plating palladium silver alloy on a surface of porous ceramics in vacuum, a plating layer is the palladium silver alloy, palladium in the palladium silver alloy is 75%~78% in mass, silver is 22%~25%.

Figure 4:
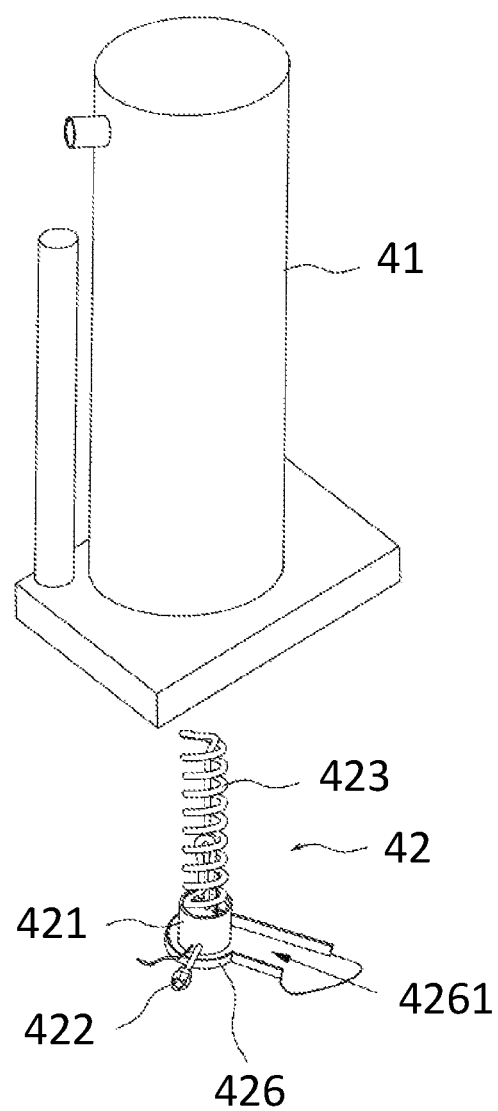
FIG. 4 is a schematic, structural view of a separated reformer according to another embodiment of the disclosure.
Figure 5:
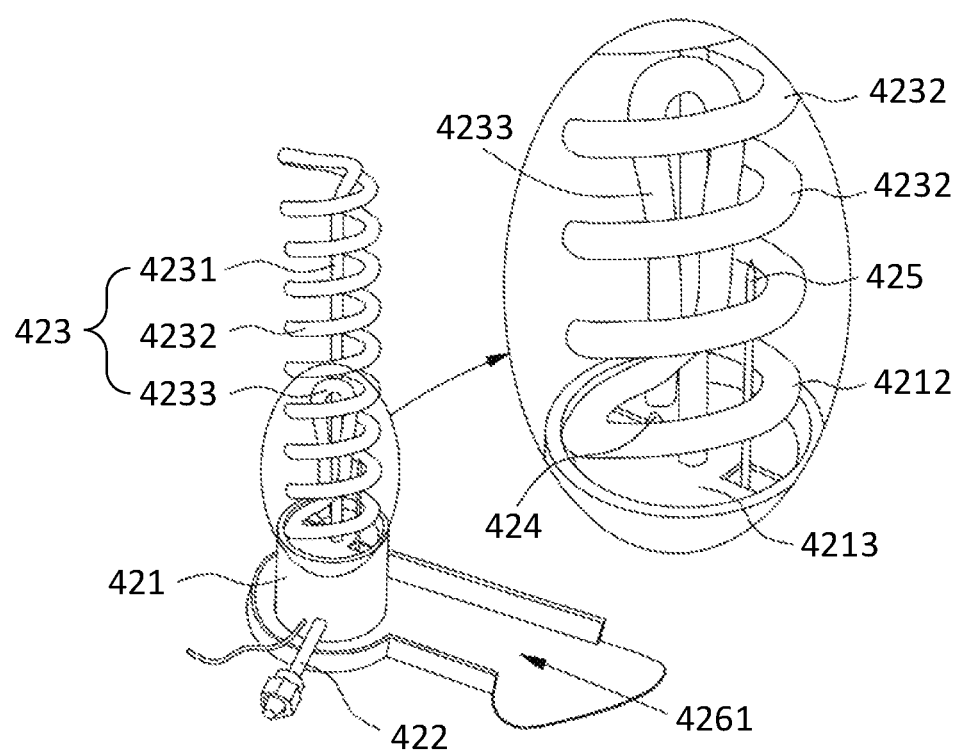
FIG. 5 is a schematic, structural view of an integrated reformer according to another embodiment of the disclosure.
Figure 6:
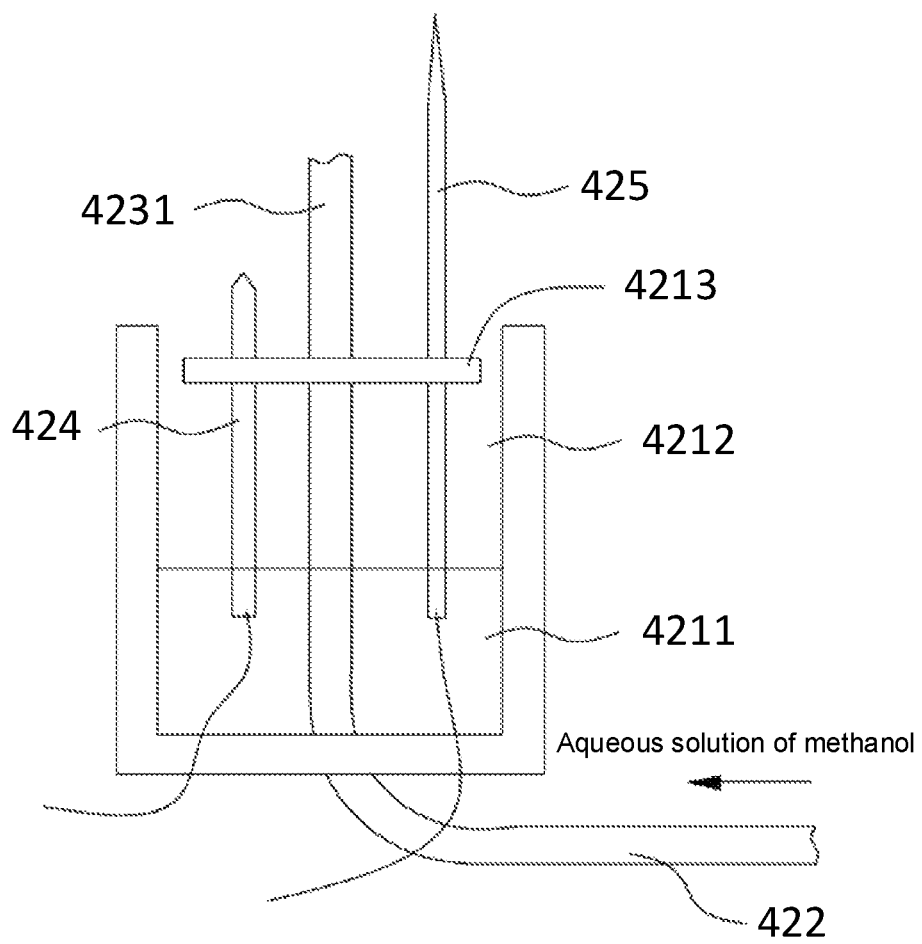
FIG. 6 is a schematic, structural view of a holder of an initiation device of a reformer according to another embodiment of the disclosure.
Figure 7:
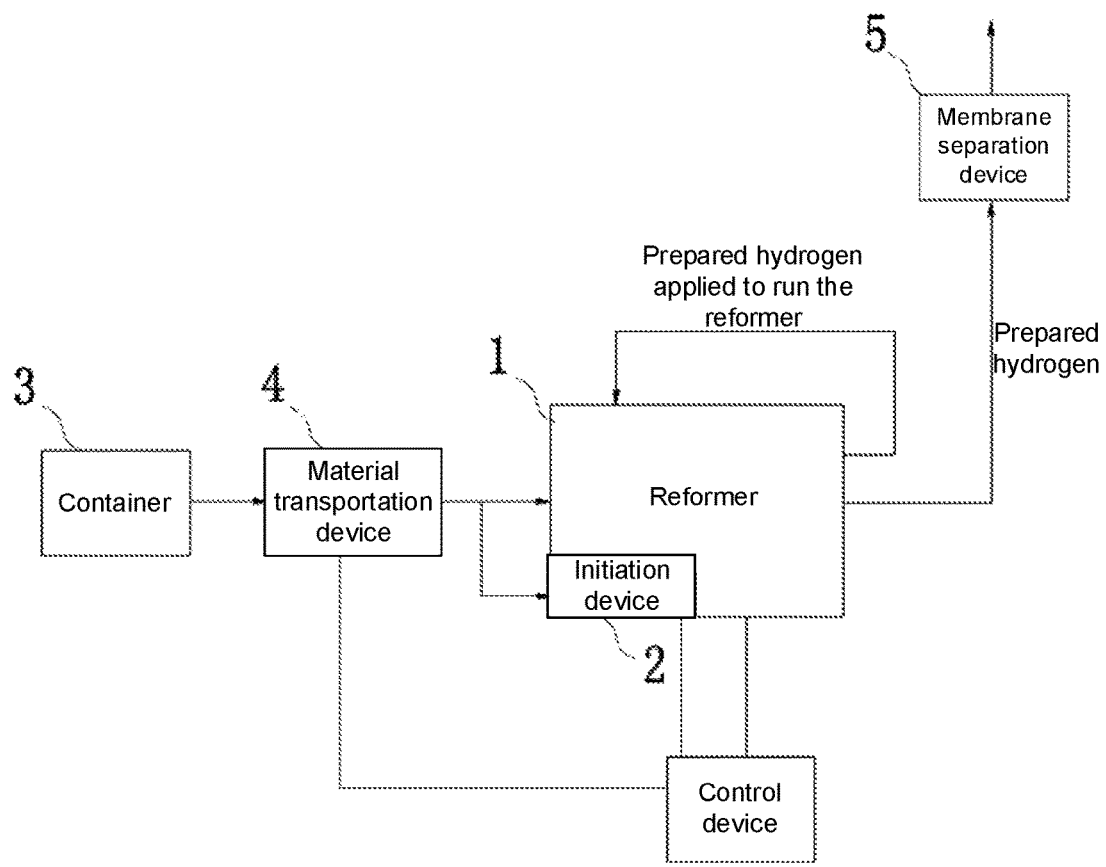
FIG. 7 is a structural view of a system for preparing hydrogen with an aqueous solution of methanol according to the disclosure.

As shown in FIG. 4~FIG. 6, the holder 421 includes a mounting section 4211 and a liquid container 4212 on the mounting section 4211, the material input tube 422, the heating vaporization tube 423, the ignition device 424 and the temperature detection device 425 are disposed on the mounting section 4211 of the holder, the liquid container 4212 can contain the material exported from the end of the heating vaporization tube 423, a splash cover 4213 is disposed on top of the liquid container 4212.

As shown in FIG. 4~FIG. 6, an internal diameter of the heating vaporization tube 423 is 1-2 cm, the heating vaporization tube 423 includes a straight section 4231, a spiral section 4232 and an arched section 4233 in sequence, the material can be transported to the highest position of the straight section 4231, and then twist down through the spiral section 4232, finally exported from the arched section 4233.

As shown in FIG. 4 and FIG. 5, a bottom of the holder 421 has an inlet cover 426, the inlet cover 426 is connected with an air passage 4261, and external air can enter the reformer 41 through the air passage 4261.

An electromagnetic valve (not shown in the figures) is disposed in the material input tube 422, in order to control the material input tube 422 to be open or closed. The ignition device can be an igniter resisting high temperature on sale, such as an electronic pulse ignition device.

Embodiment three: a hydrogen production method of the system for preparing hydrogen with an aqueous solution of methanol includes following steps.

a. A control device controls the material transportation device to transport the aqueous solution of methanol in the container to the initiation device on the end of the reformer at a first speed. The control device can include a display, a parameter input module and a control mainboard. The control mainboard can have a MCU control circuit. The MCU control circuit can be electrically connected to the material transportation device, the reformer and the initiation device. Specially, the MCU control circuit can be electrically connected to the ignition device, the temperature detection device and the input valve of the initiation device respectively. Therefore, operative modes of the material transportation device, the reformer, the ignition device, the temperature detection device and the input valve can be controlled correspondingly.

b. The aqueous solution of methanol drops out of the end of the heating vaporization tube after passing through the material input tube and the heating vaporization tube of the initiation device in turn.

c. The control device controls the ignition device to ignite, the aqueous solution of methanol dropping out of the end of the heating vaporization tube is ignited.

d. The temperature detection device detects the ambient temperature of the heating vaporization tube, and feeds the temperature back to the control device, the control device detects an ignition to be done or not; if the temperature achieves a reference of ignition set up by the control device, the aqueous solution of methanol is ignited, the ignition succeeds, if the temperature fails to achieve the reference of ignition set up by the control device, the ignition fails and the control device controls the ignition device to re-ignite.

e. After the ignition succeeds, the control device controls the material transportation device to transport the aqueous solution of methanol in the container to the initiation device on the end of the reformer at a second speed, the second speed is 1.5~3 times of the first speed.

f. Combustion intensity of the aqueous solution of methanol is increasing, the temperature is increasing, the aqueous solution of methanol in the heating vaporization tube is vaporized.

g. Vaporized aqueous solution of methanol is burning in the reformer rapidly to heat the reformer; the control device controls the material transportation device to transport the aqueous solution of methanol in the container to the reformer, a temperature in the reformer achieves a temperature for a reforming reaction of preparing hydrogen by an aqueous solution of methanol, the reformer is initiated.

h. After the reformer is initiated, the control device controls an input valve of the ignition device to be closed.

i. Partial hydrogen produced in the reformer is applied for operation of the reformer, the rest is exported after being separated by the membrane separation device.

In addition, as shown in FIG. 1, a heat exchanger 6 can be disposed out of the reformer 1, the aqueous solution of methanol in the container 3 can be transported to the heat exchanger 6 for exchanging heat, subsequently entering the reformer 1.

Above are preferred embodiments of the disclosure, any modifications, equivalent replacements or improvements within the spirit and principles of the embodiments described above should be covered by the protected scope of the disclosure.

Industrial applicability: the disclosure discloses a reformer of a system for preparing hydrogen with an aqueous solution of methanol, a system for preparing hydrogen with an aqueous solution of methanol and a method of producing hydrogen, the initiation device of the reformer is ignited by the ignition device, vaporizing the material in the heating vaporization tube and increasing combustion intensity rapidly, in order to heat the reformer, heating efficiency and speed are high, proved by a test, a restart can be done in 5 minutes, an electric heater is unnecessary in heating the initiation device of the reformer, heat efficiency is improved to the maximum extent. Therefore, it proves industrial applicability.

What is claimed is:

1. A reformer of a system for preparing hydrogen with an aqueous solution of methanol, wherein an end of the reformer has an initiation device, the initiation device comprises a holder; a material input tube, a heating vaporization tube having a first end and a second end facing toward an identical direction, an ignition device and a temperature detection device are mounted on the holder; the material input tube is communicated with the first end of the heating vaporization tube, material enters the first end of the heating vaporization tube through the material input tube and is exported from the second end of the heating vaporization tube; a position of the ignition device is corresponding to the second end of the heating vaporization tube, the ignition device is applied to ignite the material exported from the heating vaporization tube, the material burns after being ignited by the ignition device to heat the heating vaporization tube, the material in the heating vaporization tube is vaporized and combustion intensity increases rapidly in order to heat the reformer; the temperature detection device is applied to detect an ambient temperature of the heating vaporization tube;

wherein the heating vaporization tube comprises a straight section, a spiral section and an arched section sequentially connected in that order; the straight section and the arched section are located in a space surrounded by the spiral section.

2. The reformer of a system for preparing hydrogen with an aqueous solution of methanol according to claim 1, wherein the holder comprises a mounting section and a liquid container on the mounting section, the material input tube, the heating vaporization tube, the ignition device and the temperature detection device are disposed on the mounting section of the holder, the liquid container is disposed directly below the end of the heating vaporization tube, a splash cover is disposed on top of the liquid container.

3. The reformer of a system for preparing hydrogen with an aqueous solution of methanol according to claim 1, wherein a bottom of the holder has an inlet cover, the inlet cover has an air passage, external air is capable of entering the reformer through the air passage.

4. The reformer of a system for preparing hydrogen with an aqueous solution of methanol according to claim 1, wherein an electromagnetic valve is disposed in the material input tube, in order to control the material input tube to be open or closed.

5. A system for preparing hydrogen with an aqueous solution of methanol, wherein it comprises a container, a material transportation device, a reformer and a membrane separation device, wherein the material transportation device is applied to transport an aqueous solution of methanol in the container to the reformer and an initiation device on an end of the reformer respectively;

the initiation device being mounted on the end of the reformer, the initiation device comprising a holder; a material input tube, a heating vaporization tube having a first end and a second end facing toward an identical direction, an ignition device and a temperature detection device being mounted on the holder; wherein the material input tube is communicated with the first end of the heating vaporization tube, a material entering the first end of the heating vaporization tube through the material input tube and is exported from the second end of the heating vaporization tube; a position of the ignition device is corresponding to the second end of the heating vaporization tube, the ignition device is applied to ignite the material exported from the heating vaporization tube, the material-burns after being ignited by the ignition device to heat the heating vaporization tube, the material in the heating vaporization tube is vaporized and combustion intensity increasing rapidly in order to heat the reformer; the temperature detection device is applied to detect an ambient temperature of the heating vaporization tube;

the membrane separation device being a membrane separation device of plating palladium silver alloy on a surface of porous ceramics in vacuum, a plating layer being the palladium silver alloy, palladium in the palladium silver alloy being 75%~78% in mass, silver being 22%~25%;

wherein the heating vaporization tube comprises a straight section, a spiral section and an arched section sequentially connected in that order; the straight section and the arched section are located in a space surrounded by the spiral section.

6. The system for preparing hydrogen with an aqueous solution of methanol according to claim 5, wherein the holder comprises a mounting section and a liquid container on the mounting section, the material input tube, the heating vaporization tube, the ignition device and the temperature detection device are disposed on the holder of the mounting section, the liquid container is disposed directly below the end of the heating vaporization tube, a splash cover is disposed on top of the liquid container.

* * * * *